United States Patent
Jayasena

(10) Patent No.: US 12,405,897 B2
(45) Date of Patent: Sep. 2, 2025

(54) MEMORY PAGE ATTRIBUTE MODIFICATION

(71) Applicant: Advanced Micro Devices, Inc., Santa Clara, CA (US)

(72) Inventor: Nuwan S. Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/192,874

(22) Filed: Mar. 30, 2023

(65) Prior Publication Data

US 2024/0330198 A1 Oct. 3, 2024

(51) Int. Cl.
*G06F 12/1009* (2016.01)
*G06F 12/0837* (2016.01)

(52) U.S. Cl.
CPC ...... *G06F 12/1009* (2013.01); *G06F 12/0837* (2013.01)

(58) Field of Classification Search
None
See application file for complete search history.

(56) References Cited

U.S. PATENT DOCUMENTS

| | | | | |
|---|---|---|---|---|
| 6,304,944 B1* | 10/2001 | Pedneau | ............. | G06F 12/1045 711/139 |
| 9,852,084 B1* | 12/2017 | Soderquist | ......... | G06F 12/1009 |
| 11,030,113 B1* | 6/2021 | Durham | ............. | G06F 12/1027 |
| 11,474,956 B2* | 10/2022 | Grocutt | ................ | G06F 3/0673 |
| 2014/0331023 A1 | 11/2014 | Sharp et al. | | |
| 2016/0110298 A1* | 4/2016 | Koufaty | .................. | G06F 21/52 726/28 |
| 2016/0210069 A1* | 7/2016 | Lutas | .................... | G06F 3/0637 |
| 2016/0350019 A1* | 12/2016 | Koufaty | .................. | G06F 12/14 |
| 2017/0286318 A1 | 10/2017 | Brannock et al. | | |
| 2018/0074969 A1 | 3/2018 | Neiger et al. | | |
| 2018/0329835 A1* | 11/2018 | van Riel | .................. | G06F 9/46 |
| 2019/0129867 A1* | 5/2019 | Zhang | .................... | G06F 21/78 |
| 2021/0055961 A1* | 2/2021 | Shah | ....................... | G06F 21/79 |
| 2023/0350805 A1* | 11/2023 | Golla | .................. | G06F 12/0837 |

FOREIGN PATENT DOCUMENTS

EP 3907621 A1 11/2021
WO 2024205805 A1 10/2024

OTHER PUBLICATIONS

PCT/US2024/017628 , "International Search Report and Written Opinion", International Application No. PCT/US2024/017628, Jun. 18, 2024, 7 pages.

* cited by examiner

*Primary Examiner* — Nathan Sadler
(74) *Attorney, Agent, or Firm* — FIG. 1 Patents

(57) ABSTRACT

Modifying memory page attributes using a programmable page attribute register of a core executing a process is described. In accordance with the described techniques, a host includes a core that is configured to generate a modified page table attribute for a page in system memory. The modified page table attribute represents at least one demoted permission for a page as specified by a system page table. The core is configured to maintain the modified page table attribute locally in the programmable page attribute register and execute at least one operation allocated to the page according to the modified page table attribute.

20 Claims, 4 Drawing Sheets

MEMORY PAGE ATTRIBUTE MODIFICATION

BACKGROUND

Data storage for computing devices often involves retaining data in memory. In computing memory, a memory "page" refers to a unit of data in memory. Page size is often dependent on system architecture, such that one computing system has different page sizes than another computing system. Data stored in one or more memory pages is utilized by processing components (e.g., a processing unit such as a central processing unit (CPU)) for performance of various computer-related tasks, such as data processing tasks.

DETAILED DESCRIPTION

Overview

Figure 1:
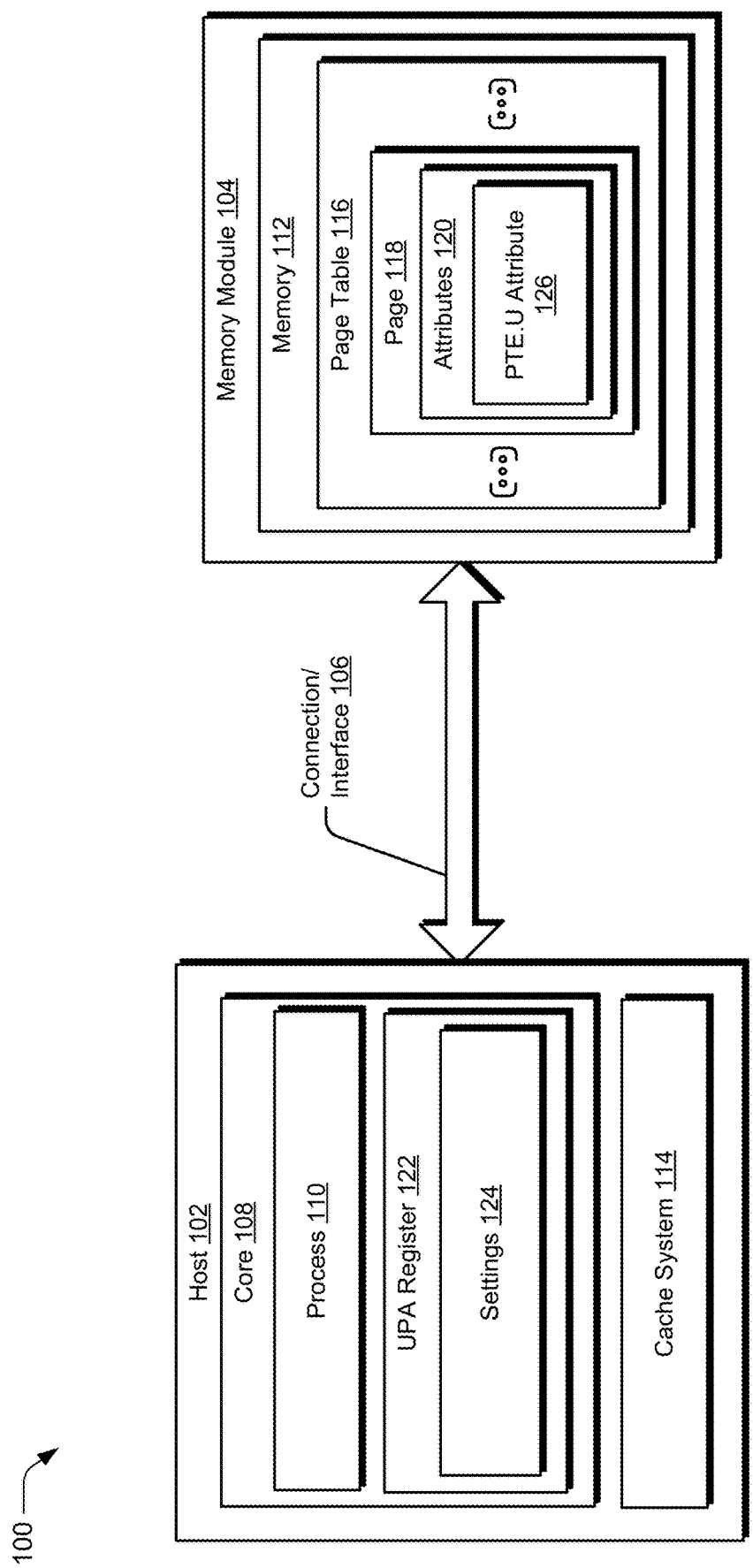
FIG. 1 is a block diagram of an example system having a memory module with a memory and a host with at least one core that includes a register for memory page attribute modifications in accordance with one or more implementations.

In computing systems, memory is allocated into pages, which each represent an addressable unit of data maintained in the memory. Each page in memory is configurable via one or more attributes, where an attribute defines what a processor is able to do with a page. For instance, a read-write attribute grants permissions for a processor to read data from a page as well as write data to the page. Alternatively, a read-only attribute permits a processor to read data from a page but prohibits the processor from writing data to the page. As another example, a cacheable attribute permits a processor to copy data from a page to a cache or other data storage location. Conversely, an uncacheable attribute prevents the processor from moving data to a cache and forces the processor to access data from, and output one or more results to, system memory.

In many implementations, page attributes are maintained at a system page table, which stores information describing mappings between virtual addresses used by a processor executing a process and physical addresses of system memory. For instance, the system page table defines attributes on a per-page basis, such that data stored in different portions of memory is restricted with respect to how it can be accessed or manipulated. As noted above, a common page table attribute defines a permission as to whether a page can be cached for use by a given process. While caching a page is useful in many implementations to make memory access more efficient, caching a page is also problematic in many scenarios.

For instance, in multi-processor system architectures, different processors require use of a common memory page. As a specific example, in many implementations systems implement one or more accelerators (e.g., graphics processing units (GPUs), processing-in-memory components, and so forth) to offload at least a portion of a computational load from a host processor. Accelerator system architectures commonly do not have fully shared caches, such that data maintained in a host processor cache is not accessible by an accelerator, and vice versa. Consequently, such system architectures require a host processor or accelerator to flush data maintained in a non-shared cache out to system memory for access by another processor or accelerator. However, flushing data from a cache to memory is an extra step that involves time and computational resources, which negatively impacts system performance. As a further drawback, flush operations commonly involve flushing all pages from a cache rather than a select subset of pages that are needed by a different processing device.

As an alternative to flushing data from a cache to memory, in some implementations a page is assigned an uncacheable (e.g., a "do not cache") attribute which causes the page to be maintained in memory and avoids the page being moved to a cache that in inaccessible by certain processing devices. Setting page attributes in a manner that optimizes system performance is dependent on one or more processes executing on the system, as well as an underlying architecture of the system executing the one or more processes. As such, while one page attribute (e.g., uncacheable) might be optimal for a process executed by a first system, a different attribute (e.g., cacheable) for the same page might be optimal when the same process is executed by a second system.

As another example, it is sometimes advantageous to change an attribute for a memory page during the course of executing a given process. For instance, consider an example scenario where a process involves a first series of operations performed by a host processor and a second series of operations performed by an accelerator using data stored in a memory page. During the first series of operations, it is advantageous for the memory page to have a cacheable attribute, such that the host processor executes the first series of operations using data maintained in a local cache, which provides the benefits of avoiding incurring traffic on a connection between the host processor and system memory and reducing system latency. However, because the accelerator cannot access data maintained in the host processor's local cache, it is no longer advantageous for the memory page to have a cacheable attribute when commencing the second series of operations.

To account for such process-specific optimization considerations, some conventional approaches involve including instructions for changing page attributes during the course of executing a process. Continuing the example above, one conventional approach includes inserting an instruction into the process that causes the system to change the memory page attribute from cacheable to uncacheable before writing the results of the first series of operations to memory, such that the accelerator is able to perform the second series of operations by accessing the memory page from system memory. However, these conventional approaches to instruction-level page attribute changes require a processing device to invoke an operating system to perform the requested attribute change via the system page table.

Invoking the operating system to change a page table attribute involves a mode switch away from a processing device executing an operation involved in the process (e.g., computing device application or algorithm) to executing an operating system operation. As another drawback to this conventional approach, in multi-processor system architectures, mode switching requires verifying whether each processor has a page address cached (e.g., maintained in a transaction lookaside buffer), before the operating system operation to change the page attribute can be executed. Mode switching is thus a time intensive process that requires significant computational resource consumption, thus resulting in degraded system performance.

As yet another drawback, optimizing system performance via the conventional approach of instruction-level page attribute changes requires knowledge of an underlying system architecture at compile time for a process, as well as knowledge of conditions that may occur at runtime, which is often impossible. For instance, continuing the example above where a given process includes first and second series of operations, it is advantageous to designate a page attribute as uncacheable for a system that uses an accelerator to perform the second series of operations rather than a host processor that performed the first series of operations. This system optimization, however, does not extend to a different system architecture that performs the first and second series of operations using a host processor, where it would be advantageous to maintain the page attribute as cacheable throughout the first and second series of operations. The underlying architecture of a system that will execute a given process is unknown upon compiling the process, which often renders processes including instruction-level attribute changes suboptimal when executed by different system architectures.

As another example, consider a scenario where a final operation of a process involves outputting data (e.g., for use by one or more downstream processes) and the process has different operations that will constitute the "final" operation, depending on conditions that occur at runtime. For instance, in this scenario a seventh operation is the "final" operation for the process in the absence of user input at runtime, while an eighth operation is the "final" operation or the process when user input is received at runtime. Whether such a condition will exist during runtime is unknown at compile time, and thus assigning an output of the seventh operation to be uncacheable (e.g., written to main memory) is suboptimal for runtime conditions where it is optimal for the eighth operation to access the seventh operation output from a local cache rather than main system memory. Consequently, conventional approaches to defining and modifying page attributes results in unnecessary consumption of computational resources, unnecessary latency in executing processes, and overall degraded system performance.

To address these problems facing conventional page attribute assignment and modification approaches, memory page attribute modification techniques are described. In implementations, a system includes a memory module having a memory that includes multiple pages. The system additionally includes a page table, which maps virtual address information to physical address information for each memory page and optionally specifies one or more attributes for individual ones of the memory pages. The memory module is communicatively coupled to at least one core of at least one host, such as a core of a host processor, which is configured to execute operations of at least one process using data maintained in at least one of the memory pages.

The core includes a user-programmable page attribute (UPA) register, which is useable by a process to modify or adjust attributes associated with select memory pages as needed to optimize a given process executed by the system. Advantageously, the UPA register enables a process to modify a memory page attribute independent of (e.g., without) altering an attribute for the memory page as maintained in a page table for an overall system. In this manner, the UPA register enables a process to modify a page attribute independent of creating traffic on a connection interfacing the host with a system entity at which the page table is stored. Further, the UPA register enables a processor core to modify a page attribute independent of invoking a system command (e.g., independent of invoking an operating system) to perform the requested attribute change, and thus enables page attribute modification without system mode switching.

To enable page attribute modification via the UPA register, entries in the system page table include a page table attribute, denoted "PTE.U" in the disclosure herein, that is selectively associated with one or more memory pages. In implementations, the PTE.U attribute is configured as a bit that indicates whether an associated memory page inherits attribute settings (e.g., one or more modified page attributes) defined in a UPA register. For instance, consider an example scenario where a system page table specifies a cacheable attribute for a memory page and a UPA register is configured with settings that restrict memory pages to have an uncacheable attribute.

Continuing this example scenario, in implementations where the PTE.U attribute bit for the memory page is set to zero, such a setting indicates that the cacheable attribute in the system page table is unmodified and that a process allocated to the memory page is permitted to cache the memory page. Alternatively, in implementations where the PTE.U attribute bit for the memory page is set to one, such a setting indicates that the cacheable attribute in the system page table is modified for the memory page and constrains the process to permissions defined by the UPA register settings (e.g., the process is prohibited from caching the memory page). This example scenario is representative of one implementation where the PTE.U bit for a memory page enables modification of system page table attributes with settings defined in a UPA register.

Altering an attribute associated with a memory page (e.g., changing the attribute from cacheable to uncacheable, and vice-versa) thus involves changing a single bit value in the UPA register, which can be performed by an application without invoking system software (e.g., the operating system). Advantageously, this enables rapid memory page attribute modification at runtime, which is not enabled by conventional approaches. Setting the PTE.U attribute for a given memory page is performed at runtime (e.g., at memory allocation time) by passing an argument to a process' memory allocation routine, which identifies that the one or more memory pages associated with the memory allocation requires application-driven page table attribute modification. This argument causes the memory allocation routine to allocate memory to pages having the PTE.U bit set in their system page table entries.

Importantly, to protect system security constraints, the UPA register is only permitted to demote attribute permissions for a given memory page or subset of pages. The UPA register is prohibited from increasing or broadening attribute permissions beyond those defined by a system page table. In implementations, a UPA register is specific to a processor core, such that in multi-core system configurations, each core includes a separate UPA register and the separate UPA registers are not required to be synchronized across different cores. Advantageously, different cores are enabled to define completely different UPA register settings, thus enabling system optimization for a range of different processing loads. Furthermore, in some implementations different processes executed by a single core each have their own UPA register, such that a UPA register is not only specific to a core but is also specific to a process running on the core. By not requiring synchronization of settings among different UPA registers, individual processes are permitted to adjust memory page attributes as needed to reduce overhead and improve computational efficiency.

In implementations, all memory pages having a PTE.U bit set (e.g., having a PTE.U value of one instead of zero) inherit attribute permission properties defined by the UPA register. Thus, to provide additional flexibility and account for scenarios where different pages are desired to have different UPA settings, some implementations include multiple different UPA registers associated with a single process running on a core. In such implementations, each of the multiple different UPA registers are configured with different attribute permission settings. Instead of a single PTE.U bit, the PTE.U attribute for each memory page is configured to include multiple bits that define which of the multiple UPA registers include the corresponding modified attribute permissions for the memory page.

Thus, the techniques described herein enable localized process optimizations, such as bypassing a cache when a core is writing data that will subsequently be consumed by an accelerator, bypassing a cache during a final write of outputs from a computation generated by a specific core, and so forth, without requiring mode switching or incurring the overhead costs required by conventional approaches. Further, because the UPA register is limited to demoting attribute permissions, the techniques described herein avoid broadening permissions beyond system settings, which thus ensures system security and does not introduce memory conflicts.

In some aspects, the techniques described herein relate to a system including a memory module including a memory and a host including a core associated with a programmable page attribute register, the core configured to generate a modified page table attribute for at least one page in the memory, maintain the modified page table attribute in the programmable page attribute register, and execute at least one operation allocated to the at least one page according to the modified page table attribute.

In some aspects, the techniques described herein relate to a system, wherein the core is configured to generate the modified page table attribute for the at least one page as part of executing an application and independent of executing a system command.

In some aspects, the techniques described herein relate to a system, wherein the core is configured to generate the modified page table attribute for the at least one page by demoting a permission described by an attribute for the at least one page included in a page table for the system.

In some aspects, the techniques described herein relate to a system, wherein the core is configured to generate the modified page table attribute independent of changing the attribute for the at least one page included in the page table for the system.

In some aspects, the techniques described herein relate to a system, wherein the host includes a plurality of cores and includes a separate programmable page attribute register for each of the plurality of cores.

In some aspects, the techniques described herein relate to a system, wherein the at least one operation is executed as part of a process and wherein the programmable page attribute register is associated with the process.

In some aspects, the techniques described herein relate to a system, wherein the core is configured to execute a different process according to a different programmable page attribute register associated with the core.

In some aspects, the techniques described herein relate to a system, wherein the modified page table attribute includes a read-only attribute and that represents a subset of permissions in a read-write attribute indicated for the at least one page in a page table of the memory module.

In some aspects, the techniques described herein relate to a system, wherein the modified page table attribute includes an uncacheable attribute that represents a subset of permissions in a cacheable attribute indicated for the at least one page in a page table of the memory module.

In some aspects, the techniques described herein relate to a system, wherein the at least one operation is performed as part of a process, the core further configured to: generate an updated page table attribute by changing the modified page table attribute in the programmable page attribute register after executing the at least one operation; and perform another operation of the process according to the updated page table attribute.

In some aspects, the techniques described herein relate to a system, wherein the core is configured to adjust a bit value in a page table entry during memory allocation for the at least one operation, the bit value indicating whether the at least one operation is executed according to the modified page table attribute or an unmodified version of the modified page table attribute.

In some aspects, the techniques described herein relate to a system, wherein the unmodified version of the modified page table attribute is maintained in a page table for the system that is separate from the programmable page attribute register.

In some aspects, the techniques described herein relate to a system, wherein the core includes a plurality of different programmable page attribute registers and the bit value indicates which one of the plurality of different programmable page attribute registers constrains execution of the at least one operation.

In some aspects, the techniques described herein relate to a system, wherein the core is configured to generate the modified page table attribute for the at least one page in the memory, independent of traffic on a connection between the host and the memory module.

In some aspects, the techniques described herein relate to a system including a first programmable page attribute register that defines an attribute for a first page in memory, a second programmable page attribute register that defines an attribute for a second page in memory, and at least one processor configured to execute a first process allocated to the first page in memory based on the first programmable page attribute register and execute a second process allocated to the second page in memory based on the second programmable page attribute register.

In some aspects, the techniques described herein relate to a system, wherein the attribute for the first page in memory defined by the first programmable page attribute register includes a demoted permission of an attribute maintained in a page table for the first page in memory and the attribute for the second page in memory defined by the second programmable page attribute register includes a demoted permission of an attribute maintained in the page table for the second page in memory.

In some aspects, the techniques described herein relate to a system, wherein the at least one processor is configured to update the attribute in the first programmable page attribute register independent of modifying the attribute maintained in the page table for the first page in memory.

In some aspects, the techniques described herein relate to a system, wherein the first process includes a plurality of operations and the at least one processor is further configured to update, after performing a first one of the plurality of operations, an attribute in the first programmable page attribute register and perform a second one of the plurality of operations based on the attribute in the first programmable page attribute register updated after performing the first one of the plurality of operations.

In some aspects, the techniques described herein relate to a method including executing, by a processor core, a first operation of a process according to a bit setting in a page table for a memory page allocated to the process, the executing including executing the first operation of the process according to attributes defined in the page table for the memory page in response to identifying that the bit setting is a first value or executing the first operation of the process according to settings defined in a register of the processor core in response to identifying that the bit setting is a second value.

In some aspects, the techniques described herein relate to a method, further including defining the bit setting in the page table for the memory page at runtime for the process.

FIG. 1 is a block diagram of an example system 100 having a memory module with a memory and a host with at least one core that includes a register for memory page attribute modifications in accordance with one or more implementations. The system 100 includes a host 102 and a memory module 104, where the host 102 and the memory module 104 are communicatively coupled via connection/interface 106. In one or more implementations, the host 102 includes a core 108. In some implementations, the host 102 includes multiple cores 108. However, because the memory page attribute modification techniques are specific to a single process running on a single core, the host 102 is described herein as being configured with a single core 108 for simplicity.

In accordance with the described techniques, the host 102 and the memory module 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations of a process 110 on and/or using data in memory 112 of the memory module 104. Examples of the host 102 and/or a core 108 of the host include, but are not limited to, a central processing unit (CPU), a graphics processing unit (GPU), a field programmable gate array (FPGA), an accelerated processing unit (APU), and a digital signal processor (DSP). For example, in one or more implementations a core 108 is a processing unit that reads and executes instructions (e.g., of process 110), examples of which include to add data, to move data, and to branch data. In some implementations, the host 102 is configured to perform various operations of a process 110 using data that is retrieved from memory and stored locally (e.g., at the host 102) via cache system 114. In some implementations, the cache system 114 represents a cache memory of the core 108 and/or the host 102 such as a level 1 cache, a level 2 cache, a level 3 cache, and so forth. Further, although illustrated as being included at the host 102, in some implementations the cache system 114 is implemented at a location in the system 100 other than the host 102.

In one or more implementations, the memory module 104 is a circuit board (e.g., a printed circuit board), on which the memory 112 is mounted. The memory 112 includes a page table 116, which is representative of data stored in the memory 112. In some implementations, the memory module 104 includes an accelerator, such as a processing-in-memory component (not depicted). In some variations, one or more integrated circuits of the memory 112 are mounted on the circuit board of the memory module 104.

Examples of the memory module 104 include, but are not limited to, a TransFlash memory module, a single in-line memory module (SIMM), and a dual in-line memory module (DIMM). In one or more implementations, the memory module 104 is a single integrated circuit device. In some examples, the memory module 104 is composed of multiple chips that are vertically ("3D") stacked together, are placed side-by-side on an interposer or substrate, or are assembled via a combination of vertical stacking or side-by-side placement.

The memory 112 is a device or system that is used to store information, such as for immediate use in a device (e.g., by a core 108 of the host 102, by another processor of the system 100, and/or by an accelerator such as a processing-in-memory component of the memory module 104). In one or more implementations, the memory 112 is to semiconductor memory where data is stored within memory cells on one or more integrated circuits. In at least one example, the memory 112 corresponds to or includes volatile memory, examples of which include random-access memory (RAM), dynamic random-access memory (DRAM), synchronous dynamic random-access memory (SDRAM), and static random-access memory (SRAM).

In some implementations, the memory module 104 represents high bandwidth memory (HBM) in a 3D-stacked implementation. Alternatively or additionally, the memory 112 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 112 is thus configurable in a variety of ways that benefit from adaptive request scheduling without departing from the spirit or scope of the described techniques.

The page table 116 is representative of information describing mappings between virtual addresses used by the core 108 when executing the process 110 and physical addresses in memory 112. The page table 116 is further representative of information describing permissions for the process 110 when the process is allocated to at least one page 118, where the permissions are represented by attributes 120 in the illustrated example of FIG. 1. By defining attributes 120 for a page 118 on a per-page basis, the page table 116 restricts different portions of memory 112 with respect to how it is accessed or manipulated by the core 108 during execution of the process 110.

For instance, in an example scenario where attributes 120 for a page 118 indicate that the page 118 is cacheable, the process 110 allocated to page 118 is permitted to cache the page 118 (e.g., in cache system 114) during execution by the core 108. Conversely, in an example scenario where attributes 120 for a page 118 indicate that the page 118 is uncacheable (e.g., not to be cached), the process 110 allocated to page 118 is prohibited from caching the page 118 during execution by the core 108.

The core 108 includes a UPA register 122, which is useable by the process 110 to modify or adjust the attributes 120 for a given page 118, as needed, to optimize execution of the process 110 by the core 108. To enable modification of the attributes 120, the UPA register 122 is configured with settings 124 that demote one or more permissions granted by the attributes 120 for the page 118. For instance, in an example scenario where the attributes 120 permit for the page 118 to be cached by the core 108, the settings 124 demote the permissions to indicate that a memory page cannot be cached. As another example, in a scenario where the attributes 120 permit read-write operations for the page 118, the settings 124 demote the permissions to indicate read-operations are permitted (e.g., that write operations on a memory page are prohibited).

To indicate whether a memory page is granted the permissions as set forth by attributes 120 in the page table 116 or is granted the demoted permissions as defined by the settings 124 in the UPA register 122, the page table attributes 120 include a PTE.U attribute 126 associated with each page, such as page 118. In implementations, the PTE.U attribute 126 is configured as a bit that indicates whether the page 118 is permitted to inherit the settings 124 of the UPA register 122. For instance, in implementations where the PTE.U attribute 126 is a bit set to zero, the zero bit indicates that executing the process 110 allocated to the page 118 is constrained by the attributes 120 defined in the page table 116. Conversely, in implementations where the PTE.U attribute 126 is a bit set to one, the one bit indicates that executing the process 110 allocated to the page 118 is constrained by the settings 124 of the UPA register 122.

Advantageously, changing the settings 124 in the UPA register 122 is performed without changing the attributes 120 set forth in the page table 116. As described in further detail below, this enables attribute modification for pages with the PTE.U attribute 126 set (e.g., page 118 in the illustrated example of FIG. 1) at runtime. By enabling attribute modification at runtime, the techniques described herein enable optimization of the process 110 given conditions that occur during runtime as well as a system architecture of a system executing the process 110 (e.g., an architecture of system 100). The core 108 is configured to adjust the PTE.U attribute 126 at runtime by passing an argument to a call to a memory allocation routine of the process 110 that specifies that the page(s) allocated in response to the call (e.g., page 118) are to use the settings 124 in place of the attributes 120 during execution of the process 110.

To protect constraints of the system 100, in some implementations the UPA register 122 is prohibited from assigning settings 124 that increase or broaden permissions granted by the attributes 120. Alternatively, in some implementations the UPA register 122 is permitted to assign settings 124 that broaden permissions granted by the attributes 120. In implementations where the UPA register 122 is permitted to designate settings 124 that broaden permissions granted by the attributes 120, the host 102 is configurable to respond in various manners. For instance, in some implementations, the host 102 is configured to select a more restrictive permission set (e.g., a more restrictive permission set as defined by the attributes 120 or the settings 124). Alternatively, in some implementations where the settings 124 broaden permissions granted by the attributes 120, the host 102 is configured to report an error and abort further execution of the process 110 or a subset thereof (e.g., a thread of execution for the process 110). In the context of the following description, however, it is presumed that the settings 124 do not increase or broaden permissions granted by the attributes 120.

Although illustrated as including a single UPA register 122 for the process 110 executed by the core 108, in some implementations the core 108 is configured to include multiple different UPA registers 122 for a single process 110. For instance, to provide additional flexibility and account for scenarios where different pages are desired to have different settings 124, each of the multiple different UPA registers 122 are configured with different settings 124. In such multi-UPA register scenarios, the PTE.U attribute 126 is configured to include multiple bits (e.g., as a multi-bit PTE.U field in a page table entry of the page table 116 for the page 118) that define which of the multiple UPA registers 122 include settings 124 that constrain corresponding modified attribute permissions for the page 118.

Figure 2:
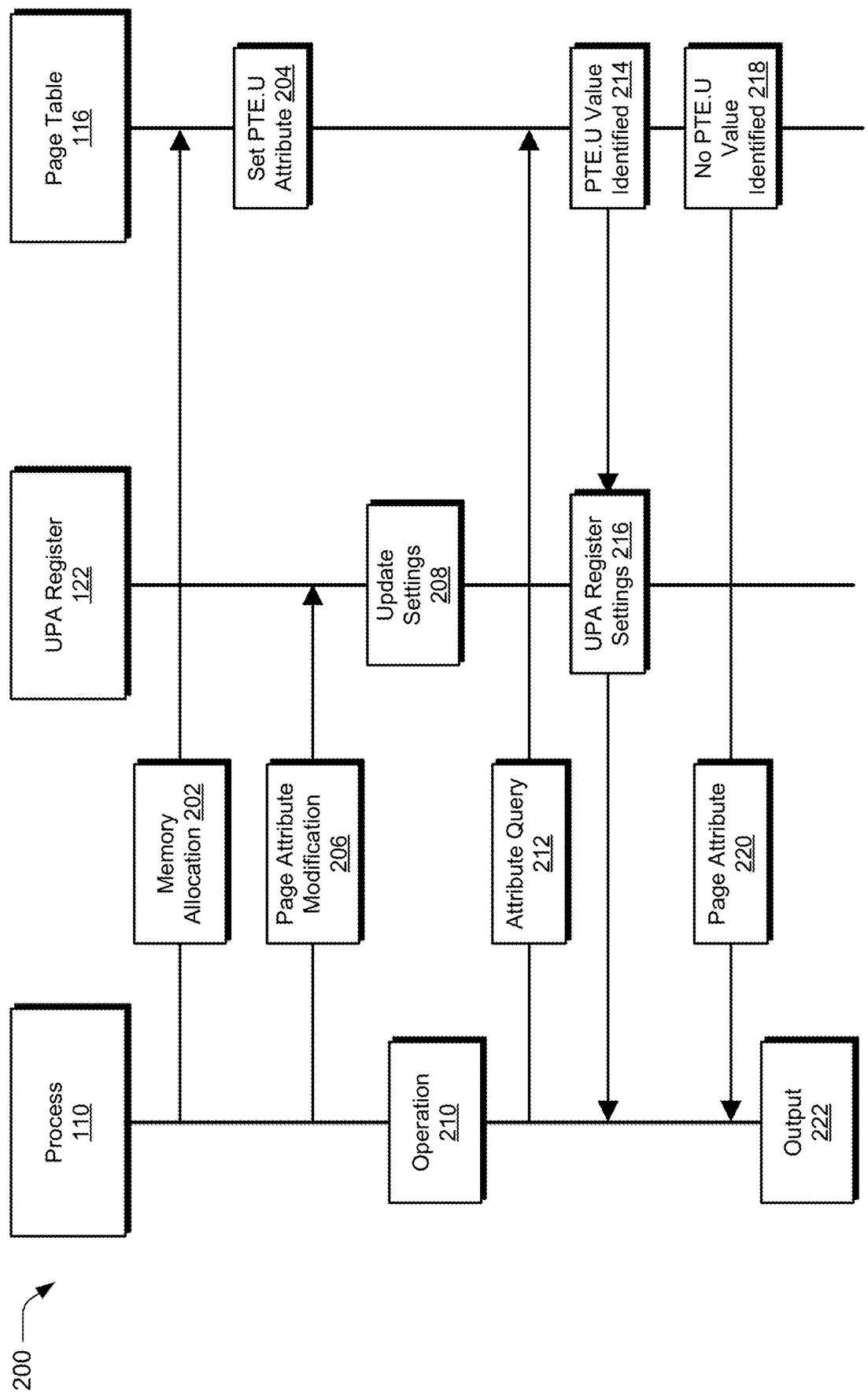
FIG. 2 depicts an example operation scenario for memory page attribute modifications in accordance with one or more implementations.

For an example operation scenario in which attributes for a page are modified via a UPA register associated with a process executed by a core, consider FIG. 2.

FIG. 2 depicts an example operation scenario 200 for memory page attribute modifications in accordance with one or more implementations. The scenario 200 includes process 110 executed on a core 108 of the host 102. The process 110, for instance, represents an instance of the process 110 introduced above, such as an application process, a system process, and so forth. The scenario 200 further includes the UPA register 122 associated with the process 110 and the page table 116 for the system 100.

As depicted in the scenario 200, memory allocation 202 is performed for the process 110. As part of performing memory allocation 202, one or more memory pages (e.g., page 118) are identified, for which settings 124 are to be applied during execution of the process 110. The page table 116 is configured to set a PTE.U attribute 204 for each of the one or more memory pages specified during memory allocation 202 as being subject to settings 124. The process 110 then issues a page attribute modification command 206 to the UPA register 122. In implementations, the page attribute modification command 206 identifies settings 124 for the one or more memory pages specified during memory allocation 202 as being subject to the settings 124 during execution of the process 110. The UPA register 122 receives the page attribute modification command 206 and is caused to define (e.g., update, modify, adjust, etc.) the settings 124 to be applied to pages with the set PTE.U attribute 204 during execution of the process 110. Definition of the settings 124 in the UPA register 122 is represented in the illustrated example of FIG. 2 by the update settings block 208.

Further to the scenario 200, at least one operation 210 of the process 110 is executed. The core 108, for instance, executes the operation 210 using data stored in the page 118. As part of executing the at least one operation 210, the process 110 sends an attribute query 212 to the page table 116 to determine what permissions are granted when performing the at least one operation 210 using the page 118. In response to identifying a PTE.U value 214 indicating that the PTE.U attribute 126 for the page 118 indicates that the settings 124 govern permissions over the attributes 120, the process 110 proceeds to execute operation 210 using UPA register settings 216 (e.g., using the settings 124). The process 110, for instance, executes operation 210 with the modified version of the attributes 120, as defined by the settings 124 in the UPA register 122.

Alternatively, in response to identifying that no PTE.U value 218 in the page table 116 is set for the page 118, the process 110 executes operation 210 with permissions set forth by the page attribute 220 for the page 118 as defined in the attributes 120 in the page table 116. Identifying that no PTE.U value 218 exists is performed, for example, in response to a PTE.U bit for the page 118 being set to zero in the page table attributes 120. In such an implementation, the PTE.U bit being set to zero indicates that settings 124 in the UPA register 122 do not govern permissions for the page 118 during execution of the operation 210.

For instance, in an implementation where the at least one operation 210 is allocated to page 118, the page attribute 220 is representative of the attributes 120 and the process 110 executes within the permission constraints set forth by the attributes 120. In some implementations, executing the at least one operation 210, according to either permissions represented by page attribute 220 or the permissions defined by the UPA register settings 216, results in generation of an output 222.

Execution of the process 110 optionally continues for one or more additional operations, where the process 110 is configured to issue at least one additional page attribute modification command 206 as needed, based on conditions that occur during execution of the process, based on an architecture of a computing system executing the process 110, and so forth.

Figure 3:
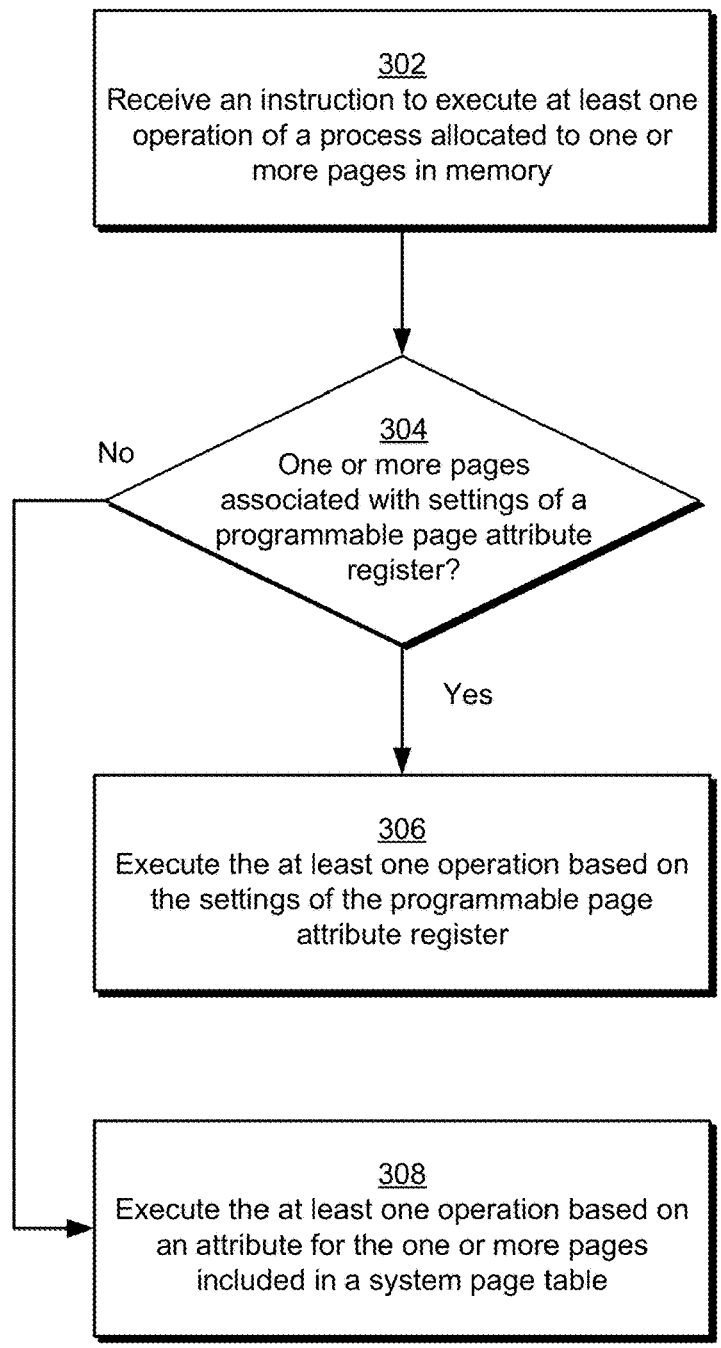
FIG. 3 illustrates a flow diagram depicting a procedure in an example implementation of memory page attribute modifications.

FIG. 3 illustrates a flow diagram depicting a procedure 300 in an example implementation of memory page attribute modifications. Aspects of the procedure 300, for example, are implemented in the context of the system 100 and/or the scenario 200.

An instruction is received to execute at least one operation of a process allocated to one or more pages in memory (block 302). By way of example, the core 108 receives an instruction to execute at least one operation of process 110 (e.g., operation 210) allocated to page 118.

It is determined whether the one or more pages are associated with settings of a programmable page attribute register (block 304). The core 108, for instance, checks a page table 116 and identifies whether a PTE.U attribute 126 for the page 118 indicates that settings 124 of the UPA register 122 are to be used in constraining permissions otherwise granted by attributes 120 for the page 118 during execution of the at least one operation of process 110. For example, the core 108 checks whether a PTE.U attribute bit entry in the page table attributes 120 for the page 118 is set to one, indicating that the settings 124 govern permissions for the page 118, or set to zero, indicating that the attributes 120 govern permissions for the page 118.

If the one or more pages are associated with settings of the programmable page attribute register (e.g., "Yes"), the at least one operation is executed based on the settings of the programmable page attribute register (block 306). The core 108, for instance, executes operation 210 of the process 110 allocated to page 118, constrained according to the settings 124 for the UPA register 122. Alternatively, if the one or more pages are not associated with the settings of the programmable page attribute register (e.g., "No"), the at least one operation is executed based on an attribute for the one or more pages included in a system page table (block 308). The core 108, for instance, executes at least one operation 210 of the process 110 allocated to page 118, constrained according to the attributes 120 defined for page 118 in the page table 116.

Figure 4:
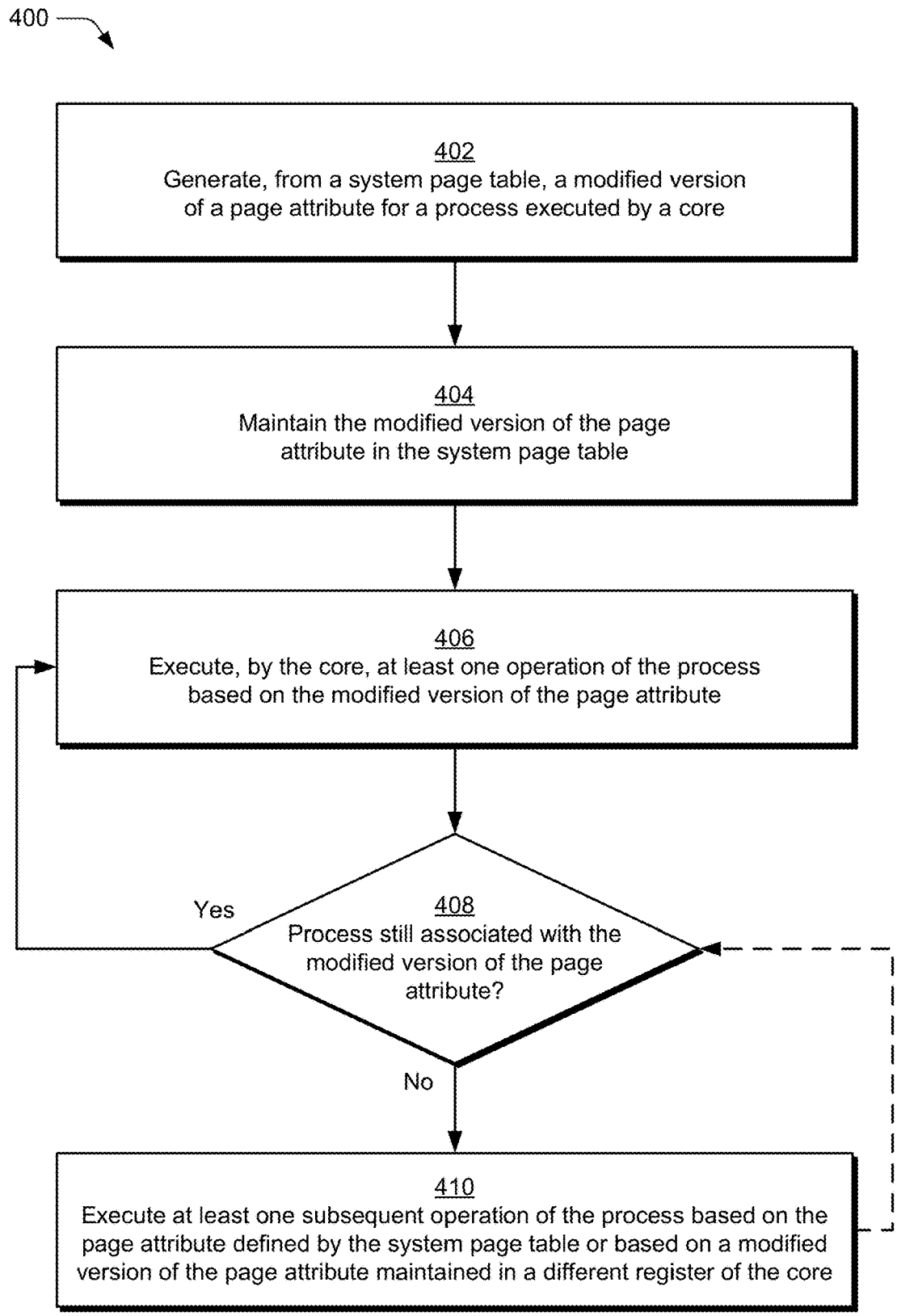
FIG. 4 illustrates a flow diagram depicting a procedure in an example implementation of memory page attribute modifications.

FIG. 4 illustrates a flow diagram depicting a procedure 400 in an example implementation of memory page attribute modifications. Aspects of the procedure 400, for example, are implemented in the context of the system 100 and/or the scenario 200.

A modified version of a page attribute for a process executed by a core is generated from a system page table (block 402). The process 110, for instance, defines at least one page 118 that is to be subject to settings 124 of the UPA register 122 as part of performing memory allocation 202. Defining at least one page 118 to be subject to the settings 124 involves setting a PTE.U attribute 126 value for the at least one page 118 in corresponding attributes 120 of the page table 116. The process 110 additionally communicates a page attribute modification command 206 to UPA register 122 that causes the UPA register 122 define settings 124, which represent modified (e.g., demoted) permissions as set forth in the attributes 120 for the page 118 in the page table 116.

The modified version of the page attribute is maintained in a register of the core (block 404). For instance, the settings 124 representing a modified (e.g., demoted) version of the attributes 120 are maintained in the UPA register 122 of the core 108. At least one operation of the process is then executed by the core based on the modified version of the page attribute (block 406). The core 108, for instance, executes at least one operation 210 of the process 110 using permissions described by the settings 124 of the UPA register 122.

A determination is then made as to whether the process remains associated with the modified version of the page attribute during execution of the process (block 408). The core 108, for instance, checks the PTE.U attribute 126 for a page 118 to which the process 110 is allocated during execution of the process 110 to determine whether the settings 124 in the UPA register 122 still govern permissions for executing operations of the process 110. If the PTE. U attribute 126 indicates that the page 118 to which the process 110 is allocated remains constrained by the settings 124 (e.g., "Yes"), operation returns to block 406 for executing a subsequent operation of the process 110.

Alternatively, if the PTE.U attribute 126 indicates that the page 118 to which the process 110 is allocated no longer remains constrained by the settings 124 of the UPA register 122 (e.g., "No"), at least one subsequent operation of the process is executed based on the page attribute defined by the system page table or based on a modified version of the page attribute maintained in a different register of the core (block 410). The core 108, for instance, checks the PTE. U attribute 126 for the page 118 and identifies that the PTE.U attribute 126 no longer indicates that settings 124 of the UPA register 122 govern permissions for executing operations of the process 110.

In implementations where the PTE.U attribute 126 indicates that no UPA register 122 settings 124 govern permissions for executing the process 110, the core 108 executes a subsequent operation of the process 110 constrained by the attributes 120 defined in the page table 116 for the page 118. Alternatively, in an implementation where the core 108 is configured with multiple different UPA registers 122 that each define different settings 124 and the PTE.U attribute 126 indicates that one of these different UPA registers 122 govern execution of the process 110, the core 108 executes the at least one subsequent operation according to the settings of the different UPA register. Operation then optionally returns to block 408 and the core 108 continues executing operations of the process 110 until the process 110 is complete.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the cache system 114 and the core 108 including the UPA register 122, as well as the memory module 104 having the page table 116 of the memory 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
executing, by a processor core, an application according to a single bit in a page table for a memory page allocated to the application, the executing comprising:
executing a first operation of the application according to attributes for the memory page defined in the page table in response to identifying that the single bit is a first value; and
executing a second operation of the application according to settings defined in a register of the processor core in response to identifying that the single bit is a second value, wherein the settings defined in the register of the processor core demote a permission for the memory page relative to the attributes for the memory page defined in the page table.

2. The method of claim 1, further comprising modifying the single bit in the page table for the memory page during execution of the application.

3. The method of claim 1, wherein modifying the single bit in the page table for the memory page comprises preventing the processor core from performing one or more tasks during execution of the second operation that the processor core was permitted to perform during execution of the first operation.

4. A system comprising:
a memory having a page table; and
a host including a core associated with a programmable page attribute register, the core configured to:
generate a modified page table attribute for at least one page in the memory by demoting a permission for the at least one page described by an attribute included in the page table;
maintain the modified page table attribute in the programmable page attribute register;
execute a first operation of an application allocated to the at least one page according to the attribute included in the page table responsive to a bit value in an entry of the page table being a first value; and
execute a second operation of the application allocated to the at least one page according to the modified page table attribute in the programmable page attribute register responsive to the bit value in the entry of the page table being a second value.

5. The system of claim 4, wherein the core is configured to generate the modified page table attribute for the at least one page as part of executing the application and independent of executing a system command.

6. The system of claim 4, wherein the core is configured to generate the modified page table attribute independent of changing the attribute for the at least one page included in the page table.

7. The system of claim 4, wherein the host includes a plurality of cores and includes a separate programmable page attribute register for each of the plurality of cores.

8. The system of claim 4, wherein the programmable page attribute register is associated with the application.

9. The system of claim 8, wherein the core is configured to execute a different application according to a different programmable page attribute register associated with the core.

10. The system of claim 4, wherein the modified page table attribute comprises a read-only attribute and that represents a subset of permissions in a read-write attribute indicated for the at least one page in the page table.

11. The system of claim 4, wherein the modified page table attribute comprises an uncacheable attribute that represents a subset of permissions in a cacheable attribute indicated for the at least one page in the page table.

12. The system of claim 4, the core further configured to:
generate an updated page table attribute by changing the modified page table attribute in the programmable page attribute register after executing the first operation of the application; and
perform a third operation of the application according to the updated page table attribute in the programmable page attribute register.

13. The system of claim 4, wherein the core is further configured to adjust in the bit value in the entry of the page table after executing the first operation of the application from the first value to the second value.

14. The system of claim 13, wherein the entry of the page table is separate from the programmable page attribute register.

15. The system of claim 13, wherein the core is further configured to adjust two or more bit values in the entry of the page table, wherein the core includes a plurality of different programmable page attribute registers and the two or more bit values indicate which one of the plurality of different programmable page attribute registers constrains execution of operations allocated to the at least one page.

16. The system of claim 4, wherein the core is configured to generate the modified page table attribute for the at least one page in the memory, independent of traffic on a connection between the host and the memory.

17. A system comprising:
    a memory having a page table; and
    a processor comprising a programmable page attribute register that defines an attribute for a page in the memory, the processor configured to:
    generate a modified page table attribute for a page in the memory by demoting a permission, for the page in the memory, described by an attribute included in the page table;
    maintain the modified page table attribute in a programmable page attribute register;
    execute a first operation of an application allocated to the page in the memory based on the programmable page attribute register, responsive to a bit value in an entry of the page table specifying that the programmable page attribute register governs permissions for the page in the memory; and
    execute a second operation of the application allocated to the page in the memory based on the page table, responsive to the bit value in the entry of the page table specifying that the page table governs the permissions for the page in the memory.

18. The system of claim 17, wherein the processor is configured to update the attribute in the programmable page attribute register independent of modifying the attribute maintained in the page table for the page in the memory.

19. The system of claim 17, wherein the processor is further configured to:
    update, after performing the first operation, an attribute in the programmable page attribute register; and
    perform a third operation of the application based on the attribute in the programmable page attribute register as updated after performing the first operation, wherein the third operation of the application is executed with different permissions relative to the permissions authorized by the programmable page attribute register for the first operation.

20. The system of claim 17, wherein the processor is configured to:
    execute the first operation of the application allocated to the page in the memory based on the programmable page attribute register, responsive to a bit value in an entry of the page table specifying that the programmable page attribute register governs permissions for the page in the memory; and
    execute the second operation of the application allocated to the page in the memory based on the page table, responsive to the bit value in the entry of the page table specifying that the page table governs the permissions for the page in the memory.

* * * * *